US008683988B2

(12) United States Patent
McAlister et al.

(10) Patent No.: US 8,683,988 B2
(45) Date of Patent: Apr. 1, 2014

(54) SYSTEMS AND METHODS FOR IMPROVED ENGINE COOLING AND ENERGY GENERATION

(75) Inventors: Roy Edward McAlister, Phoenix, AZ (US); Melvin James Larsen, Chandler, AZ (US); Roy Edward McAlister, legal representative, Phoenix, AZ (US)

(73) Assignee: McAlister Technologies, LLC, Phoenix, AZ (US)

( * ) Notice: Subject to any disclaimer, the term of this patent is extended or adjusted under 35 U.S.C. 154(b) by 0 days.

(21) Appl. No.: 13/584,775

(22) Filed: Aug. 13, 2012

(65) Prior Publication Data

US 2013/0206082 A1 Aug. 15, 2013

Related U.S. Application Data

(60) Provisional application No. 61/523,157, filed on Aug. 12, 2011.

(51) Int. Cl.
*F02B 47/02* (2006.01)
*F02B 13/00* (2006.01)
*F01P 7/16* (2006.01)

(52) U.S. Cl.
USPC ....... 123/578; 123/25 C; 123/25 J; 123/25 K; 123/25 R; 123/25 Q; 123/DIG. 8; 123/575; 60/718; 60/709; 60/698; 60/715

(58) Field of Classification Search
USPC .... 123/25 R, 25 J, 25 K, 25 Q, 25 C, DIG. 8, 123/58.8, 575, 578; 60/718, 709, 698, 715
See application file for complete search history.

(56) References Cited

U.S. PATENT DOCUMENTS 1,451,384 A 4/1923 Whyte
1,765,237 A 6/1930 King
(Continued)

FOREIGN PATENT DOCUMENTS

DE 3443022 5/1986
EP 392594 A2 10/1990
(Continued)

OTHER PUBLICATIONS

"Ford DIS/EDIS "Waste Spark" Ignition System." Accessed: Jul. 15, 2010. Printed: Jun. 8, 2011. <http://rockledge.home.comcast.net/~rockledge/RangerPictureGallery/DIS_EDIS.htm>. pp. 1-4.

(Continued)

*Primary Examiner* — Lindsay Low
*Assistant Examiner* — Tea Holbrook
(74) *Attorney, Agent, or Firm* — Perkins Coie LLP

(57) ABSTRACT

Embodiments of engine systems for improved engine cooling and work production are disclosed herein. A working fluid can be injected into a combustion chamber or an engine during any portion of an energy cycle to cool the engine and/or to produce useful work in addition to work generated by combustion events in the chamber. The system can include a monitoring system configured to measure conditions within individual combustion chambers. Based on the interior conditions of the chamber, the system can adaptively inject working fluid mixtures into the engine. The engine can be part of a cascading series of engines including a primary engine and a secondary engine that receives fluids from the primary engine and generates energy from the fluids.

14 Claims, 6 Drawing Sheets

(56) References Cited

U.S. PATENT DOCUMENTS

| | | |
|---|---|---|
| 2,068,038 A | 1/1937 | Prothero et al. |
| 2,215,793 A | 9/1940 | Mayes |
| 2,255,203 A | 9/1941 | Wiegand |
| 2,441,277 A | 5/1948 | Lamphere |
| 2,721,100 A | 10/1955 | Bodine, Jr. |
| 3,058,453 A | 10/1962 | May |
| 3,060,912 A | 10/1962 | May |
| 3,081,758 A | 3/1963 | May |
| 3,243,335 A | 3/1966 | Faile |
| 3,286,164 A | 11/1966 | De Huff |
| 3,373,724 A | 3/1968 | Papst |
| 3,391,680 A | 7/1968 | Benson |
| 3,520,961 A | 7/1970 | Suda et al. |
| 3,594,877 A | 7/1971 | Suda et al. |
| 3,608,050 A | 9/1971 | Carman et al. |
| 3,689,293 A | 9/1972 | Beall |
| 3,745,887 A | 7/1973 | Striegl |
| 3,926,169 A | 12/1975 | Leshner et al. |
| 3,931,438 A | 1/1976 | Beall et al. |
| 3,960,995 A | 6/1976 | Kourkene |
| 3,976,039 A * | 8/1976 | Henault .................... 123/274 |
| 3,997,352 A | 12/1976 | Beall |
| 4,020,803 A | 5/1977 | Thuren et al. |
| 4,041,910 A | 8/1977 | Houseman |
| 4,062,338 A | 12/1977 | Toth |
| 4,066,046 A | 1/1978 | McAlister |
| 4,095,580 A | 6/1978 | Murray et al. |
| 4,105,004 A | 8/1978 | Asai et al. |
| 4,116,389 A | 9/1978 | Furtah et al. |
| 4,122,816 A | 10/1978 | Fitzgerald et al. |
| 4,135,481 A * | 1/1979 | Resler, Jr. .................. 123/430 |
| 4,172,921 A | 10/1979 | Kiefer |
| 4,183,467 A | 1/1980 | Sheraton et al. |
| 4,203,393 A | 5/1980 | Giardini |
| 4,293,188 A | 10/1981 | McMahon |
| 4,330,732 A | 5/1982 | Lowther |
| 4,332,223 A | 6/1982 | Dalton |
| 4,364,342 A | 12/1982 | Asik |
| 4,364,363 A | 12/1982 | Miyagi et al. |
| 4,368,707 A | 1/1983 | Leshner et al. |
| 4,377,455 A | 3/1983 | Kadija et al. |
| 4,381,740 A | 5/1983 | Crocker |
| 4,382,189 A | 5/1983 | Wilson |
| 4,391,914 A | 7/1983 | Beall |
| 4,413,474 A | 11/1983 | Moscrip |
| 4,432,310 A | 2/1984 | Waller |
| 4,448,160 A | 5/1984 | Vosper |
| 4,469,160 A | 9/1984 | Giamei |
| 4,483,485 A | 11/1984 | Kamiya et al. |
| 4,511,612 A | 4/1985 | Huther et al. |
| 4,528,270 A | 7/1985 | Matsunaga |
| 4,536,452 A | 8/1985 | Stempin et al. |
| 4,553,508 A | 11/1985 | Stinebaugh |
| 4,567,857 A | 2/1986 | Houseman et al. |
| 4,574,037 A | 3/1986 | Samejima et al. |
| 4,677,960 A | 7/1987 | Ward |
| 4,684,211 A | 8/1987 | Weber et al. |
| 4,688,538 A | 8/1987 | Ward et al. |
| 4,700,891 A | 10/1987 | Hans et al. |
| 4,716,874 A | 1/1988 | Hilliard et al. |
| 4,733,646 A | 3/1988 | Iwasaki |
| 4,736,718 A | 4/1988 | Linder |
| 4,742,265 A | 5/1988 | Giachino et al. |
| 4,760,818 A | 8/1988 | Brooks et al. |
| 4,760,820 A | 8/1988 | Tozzi |
| 4,774,914 A | 10/1988 | Ward |
| 4,774,919 A | 10/1988 | Matsuo et al. |
| 4,777,925 A | 10/1988 | LaSota |
| 4,834,033 A | 5/1989 | Larsen |
| 4,841,925 A | 6/1989 | Ward |
| 4,884,533 A | 12/1989 | Risitano et al. |
| 4,922,883 A | 5/1990 | Iwasaki |
| 4,932,263 A | 6/1990 | Wlodarczyk |
| 4,967,708 A | 11/1990 | Linder et al. |
| 4,977,873 A | 12/1990 | Cherry et al. |
| 4,979,406 A | 12/1990 | Waller |
| 4,982,708 A | 1/1991 | Stutzenberger |
| 5,034,852 A | 7/1991 | Rosenberg |
| 5,035,360 A | 7/1991 | Green et al. |
| 5,036,669 A | 8/1991 | Earleson et al. |
| 5,055,435 A | 10/1991 | Hamanaka et al. |
| 5,056,496 A | 10/1991 | Morino et al. |
| 5,069,189 A | 12/1991 | Saito |
| 5,072,617 A | 12/1991 | Weiss |
| 5,076,223 A | 12/1991 | Harden et al. |
| 5,095,742 A | 3/1992 | James et al. |
| 5,107,673 A | 4/1992 | Sato et al. |
| 5,109,817 A | 5/1992 | Cherry |
| 5,125,366 A * | 6/1992 | Hobbs .................... 123/25 C |
| 5,131,376 A | 7/1992 | Ward et al. |
| 5,150,682 A | 9/1992 | Magnet |
| 5,193,515 A | 3/1993 | Oota et al. |
| 5,207,208 A | 5/1993 | Ward |
| 5,211,142 A | 5/1993 | Matthews et al. |
| 5,220,901 A | 6/1993 | Morita et al. |
| 5,222,481 A | 6/1993 | Morikawa |
| 5,267,601 A | 12/1993 | Dwivedi |
| 5,297,518 A | 3/1994 | Cherry |
| 5,305,360 A | 4/1994 | Remark et al. |
| 5,328,094 A | 7/1994 | Goetzke et al. |
| 5,329,606 A | 7/1994 | Andreassen |
| 5,343,699 A | 9/1994 | McAlister |
| 5,377,633 A | 1/1995 | Wakeman |
| 5,390,546 A | 2/1995 | Wlodarczyk |
| 5,392,745 A | 2/1995 | Beck |
| 5,394,838 A | 3/1995 | Chandler |
| 5,394,852 A | 3/1995 | McAlister |
| 5,421,195 A | 6/1995 | Wlodarczyk |
| 5,421,299 A | 6/1995 | Cherry |
| 5,435,286 A | 7/1995 | Carroll, III et al. |
| 5,439,532 A | 8/1995 | Fraas |
| 5,456,241 A | 10/1995 | Ward |
| 5,475,772 A | 12/1995 | Hung et al. |
| 5,497,744 A | 3/1996 | Nagaosa et al. |
| 5,517,961 A | 5/1996 | Ward |
| 5,531,199 A | 7/1996 | Bryant et al. |
| 5,549,746 A | 8/1996 | Scott et al. |
| 5,568,801 A | 10/1996 | Paterson et al. |
| 5,584,490 A | 12/1996 | Inoue et al. |
| 5,588,299 A | 12/1996 | DeFreitas |
| 5,605,125 A | 2/1997 | Yaoita |
| 5,607,106 A | 3/1997 | Bentz et al. |
| 5,608,832 A | 3/1997 | Pfandl et al. |
| 5,662,389 A | 9/1997 | Truglio et al. |
| 5,676,026 A | 10/1997 | Tsuboi et al. |
| 5,694,761 A | 12/1997 | Griffin, Jr. |
| 5,699,253 A | 12/1997 | Puskorius et al. |
| 5,702,761 A | 12/1997 | DiChiara, Jr. et al. |
| 5,704,321 A | 1/1998 | Suckewer et al. |
| 5,704,553 A | 1/1998 | Wieczorek et al. |
| 5,714,680 A | 2/1998 | Taylor et al. |
| 5,715,788 A | 2/1998 | Tarr et al. |
| 5,733,105 A | 3/1998 | Beckett et al. |
| 5,738,818 A | 4/1998 | Atmur et al. |
| 5,745,615 A | 4/1998 | Atkins et al. |
| 5,746,171 A | 5/1998 | Yaoita |
| 5,767,026 A | 6/1998 | Kondoh et al. |
| 5,797,427 A | 8/1998 | Buescher |
| 5,806,581 A | 9/1998 | Haasch et al. |
| 5,816,217 A | 10/1998 | Wong |
| 5,853,175 A | 12/1998 | Udagawa |
| 5,863,326 A | 1/1999 | Nause et al. |
| 5,876,659 A | 3/1999 | Yasutomi et al. |
| 5,915,272 A | 6/1999 | Foley et al. |
| 5,930,420 A | 7/1999 | Atkins et al. |
| 5,941,207 A * | 8/1999 | Anderson et al. ............ 123/295 |
| 5,947,091 A | 9/1999 | Krohn et al. |
| 5,975,032 A | 11/1999 | Iwata |
| 5,983,855 A | 11/1999 | Benedikt et al. |
| 6,000,628 A | 12/1999 | Lorraine |
| 6,015,065 A | 1/2000 | McAlister |
| 6,017,390 A | 1/2000 | Charych et al. |
| 6,021,573 A | 2/2000 | Kikuchi et al. |
| 6,026,568 A | 2/2000 | Atmur et al. |

(56) References Cited

U.S. PATENT DOCUMENTS

| | | | |
|---|---|---|---|
| 6,029,627 | A | 2/2000 | VanDyne |
| 6,042,028 | A | 3/2000 | Xu |
| 6,062,498 | A | 5/2000 | Klopfer |
| 6,081,183 | A | 6/2000 | Mading et al. |
| 6,085,990 | A | 7/2000 | Augustin |
| 6,092,501 | A | 7/2000 | Matayoshi et al. |
| 6,092,507 | A * | 7/2000 | Bauer et al. ............... 123/430 |
| 6,093,338 | A | 7/2000 | Tani et al. |
| 6,102,303 | A | 8/2000 | Bright et al. |
| 6,131,607 | A | 10/2000 | Cooke |
| 6,138,639 | A | 10/2000 | Hiraya et al. |
| 6,155,212 | A | 12/2000 | McAlister |
| 6,157,011 | A | 12/2000 | Lai |
| 6,173,913 | B1 | 1/2001 | Shafer et al. |
| 6,176,075 | B1 | 1/2001 | Griffin, Jr. |
| 6,185,355 | B1 | 2/2001 | Hung |
| 6,189,522 | B1 | 2/2001 | Moriya |
| 6,253,728 | B1 | 7/2001 | Matayoshi et al. |
| 6,267,307 | B1 | 7/2001 | Pontoppidan |
| 6,281,976 | B1 | 8/2001 | Taylor et al. |
| 6,318,306 | B1 | 11/2001 | Komatsu |
| 6,335,065 | B1 | 1/2002 | Steinlage et al. |
| 6,338,445 | B1 | 1/2002 | Lambert et al. |
| 6,340,015 | B1 | 1/2002 | Benedikt et al. |
| 6,360,721 | B1 | 3/2002 | Schuricht et al. |
| 6,378,485 | B2 | 4/2002 | Elliott |
| 6,386,178 | B1 | 5/2002 | Rauch |
| 6,446,597 | B1 | 9/2002 | McAlister |
| 6,453,660 | B1 | 9/2002 | Johnson et al. |
| 6,455,173 | B1 | 9/2002 | Marijnissen et al. |
| 6,455,451 | B1 | 9/2002 | Brodkin et al. |
| 6,478,007 | B2 | 11/2002 | Miyashita et al. |
| 6,483,311 | B1 | 11/2002 | Ketterer et al. |
| 6,487,858 | B2 | 12/2002 | Cammack |
| 6,490,391 | B1 | 12/2002 | Zhao et al. |
| 6,501,875 | B2 | 12/2002 | Zhao et al. |
| 6,503,584 | B1 | 1/2003 | McAlister |
| 6,506,336 | B1 | 1/2003 | Beall et al. |
| 6,516,114 | B2 | 2/2003 | Zhao et al. |
| 6,517,011 | B1 | 2/2003 | Ayanji et al. |
| 6,517,623 | B1 | 2/2003 | Brodkin et al. |
| 6,532,315 | B1 | 3/2003 | Hung et al. |
| 6,536,405 | B1 | 3/2003 | Rieger et al. |
| 6,542,663 | B1 | 4/2003 | Zhao et al. |
| 6,543,700 | B2 | 4/2003 | Jameson et al. |
| 6,549,713 | B1 | 4/2003 | Pi et al. |
| 6,550,458 | B2 | 4/2003 | Yamakado et al. |
| 6,556,746 | B1 | 4/2003 | Zhao et al. |
| 6,561,168 | B2 | 5/2003 | Hokao et al. |
| 6,567,599 | B2 | 5/2003 | Hung |
| 6,571,035 | B1 | 5/2003 | Pi et al. |
| 6,578,775 | B2 | 6/2003 | Hokao |
| 6,583,901 | B1 | 6/2003 | Hung |
| 6,584,244 | B2 | 6/2003 | Hung |
| 6,585,171 | B1 | 7/2003 | Boecking |
| 6,587,239 | B1 | 7/2003 | Hung |
| 6,615,810 | B2 | 9/2003 | Funk et al. |
| 6,615,899 | B1 | 9/2003 | Woodward et al. |
| 6,619,269 | B1 | 9/2003 | Stier et al. |
| 6,621,964 | B2 | 9/2003 | Quinn et al. |
| 6,647,948 | B2 | 11/2003 | Kyuuma et al. |
| 6,663,027 | B2 | 12/2003 | Jameson et al. |
| 6,672,277 | B2 | 1/2004 | Yasuoka et al. |
| 6,700,306 | B2 | 3/2004 | Nakamura et al. |
| 6,705,274 | B2 | 3/2004 | Kubo |
| 6,719,224 | B2 | 4/2004 | Enomoto et al. |
| 6,722,339 | B2 | 4/2004 | Elliott |
| 6,722,340 | B1 | 4/2004 | Sukegawa et al. |
| 6,722,840 | B2 | 4/2004 | Fujisawa et al. |
| 6,725,826 | B2 | 4/2004 | Esteghlal |
| 6,745,744 | B2 | 6/2004 | Suckewer et al. |
| 6,748,918 | B2 | 6/2004 | Rieger et al. |
| 6,749,043 | B2 | 6/2004 | Brown et al. |
| 6,755,175 | B1 | 6/2004 | McKay et al. |
| 6,756,140 | B1 * | 6/2004 | McAlister ............... 429/411 |
| 6,763,811 | B1 | 7/2004 | Tamol, Sr. |
| 6,776,352 | B2 | 8/2004 | Jameson |
| 6,779,513 | B2 | 8/2004 | Pellizzari et al. |
| 6,796,284 | B1 | 9/2004 | Von Wielligh |
| 6,796,516 | B2 | 9/2004 | Maier et al. |
| 6,799,513 | B2 | 10/2004 | Schafer |
| 6,802,894 | B2 | 10/2004 | Brodkin et al. |
| 6,811,103 | B2 | 11/2004 | Gurich et al. |
| 6,814,313 | B2 | 11/2004 | Petrone et al. |
| 6,832,472 | B2 | 12/2004 | Huang et al. |
| 6,832,588 | B2 | 12/2004 | Herden et al. |
| 6,845,920 | B2 | 1/2005 | Sato et al. |
| 6,851,413 | B1 | 2/2005 | Tamol, Sr. |
| 6,854,438 | B2 | 2/2005 | Hilger et al. |
| 6,871,630 | B2 | 3/2005 | Herden et al. |
| 6,883,490 | B2 | 4/2005 | Jayne |
| 6,892,971 | B2 | 5/2005 | Rieger et al. |
| 6,898,355 | B2 | 5/2005 | Johnson et al. |
| 6,899,076 | B2 | 5/2005 | Funaki et al. |
| 6,904,893 | B2 | 6/2005 | Hotta et al. |
| 6,912,998 | B1 | 7/2005 | Rauznitz et al. |
| 6,925,983 | B2 | 8/2005 | Herden et al. |
| 6,940,213 | B1 | 9/2005 | Heinz et al. |
| 6,954,074 | B2 | 10/2005 | Zhu et al. |
| 6,955,154 | B1 | 10/2005 | Douglas |
| 6,955,165 | B2 | 10/2005 | Liu |
| 6,959,693 | B2 | 11/2005 | Oda |
| 6,976,683 | B2 | 12/2005 | Eckert et al. |
| 6,984,305 | B2 | 1/2006 | McAlister |
| 6,993,960 | B2 | 2/2006 | Benson |
| 6,994,073 | B2 | 2/2006 | Tozzi et al. |
| 7,007,658 | B1 | 3/2006 | Cherry et al. |
| 7,007,661 | B2 | 3/2006 | Warlick |
| 7,013,863 | B2 | 3/2006 | Shiraishi et al. |
| 7,025,358 | B2 | 4/2006 | Ueta et al. |
| 7,032,845 | B2 | 4/2006 | Dantes et al. |
| 7,070,126 | B2 | 7/2006 | Shinogle |
| 7,073,480 | B2 | 7/2006 | Shiraishi et al. |
| 7,077,100 | B2 | 7/2006 | Vogel et al. |
| 7,077,108 | B2 | 7/2006 | Fujita et al. |
| 7,077,379 | B1 | 7/2006 | Taylor |
| 7,086,376 | B2 | 8/2006 | McKay |
| 7,104,246 | B1 | 9/2006 | Gagliano et al. |
| 7,104,250 | B1 | 9/2006 | Yi et al. |
| 7,121,253 | B2 | 10/2006 | Shiraishi et al. |
| 7,131,426 | B2 | 11/2006 | Ichinose et al. |
| 7,137,382 | B2 | 11/2006 | Zhu et al. |
| 7,138,046 | B2 | 11/2006 | Roychowdhury |
| 7,140,347 | B2 | 11/2006 | Suzuki et al. |
| 7,140,353 | B1 | 11/2006 | Rauznitz et al. |
| 7,140,562 | B2 | 11/2006 | Holzgrefe et al. |
| 7,201,136 | B2 | 4/2007 | McKay et al. |
| 7,204,133 | B2 | 4/2007 | Benson et al. |
| 7,228,840 | B2 | 6/2007 | Sukegawa et al. |
| 7,249,578 | B2 | 7/2007 | Fricke et al. |
| 7,255,290 | B2 | 8/2007 | Bright et al. |
| 7,272,487 | B2 | 9/2007 | Christen et al. |
| 7,278,392 | B2 | 10/2007 | Zillmer et al. |
| 7,305,971 | B2 | 12/2007 | Fujii |
| 7,309,029 | B2 | 12/2007 | Boecking |
| 7,334,558 | B2 | 2/2008 | Higgins |
| 7,340,118 | B2 | 3/2008 | Wlodarczyk et al. |
| 7,357,108 | B2 | 4/2008 | Gracyalny |
| 7,367,319 | B2 | 5/2008 | Kuo et al. |
| 7,386,982 | B2 | 6/2008 | Runkle et al. |
| 7,404,395 | B2 | 7/2008 | Yoshimoto |
| 7,409,929 | B2 | 8/2008 | Miyahara et al. |
| 7,418,940 | B1 | 9/2008 | Yi et al. |
| 7,481,043 | B2 | 1/2009 | Hirata et al. |
| 7,484,369 | B2 | 2/2009 | Myhre |
| 7,513,222 | B2 | 4/2009 | Orlosky |
| 7,527,041 | B2 | 5/2009 | Wing et al. |
| 7,540,271 | B2 | 6/2009 | Stewart et al. |
| 7,554,250 | B2 | 6/2009 | Kadotani et al. |
| 7,574,983 | B2 | 8/2009 | Kuo |
| 7,588,012 | B2 | 9/2009 | Gibson et al. |
| 7,624,569 | B2 * | 12/2009 | Driscoll et al. ............... 60/285 |
| 7,625,531 | B1 | 12/2009 | Coates et al. |
| 7,626,315 | B2 | 12/2009 | Nagase |

(56) References Cited

U.S. PATENT DOCUMENTS

| | | | |
|---|---|---|---|
| 7,628,137 B1 | 12/2009 | McAlister | |
| 7,650,873 B2 | 1/2010 | Hofbauer et al. | |
| 7,703,775 B2 | 4/2010 | Matsushita et al. | |
| 7,707,832 B2 | 5/2010 | Commaret et al. | |
| 7,714,483 B2 | 5/2010 | Hess et al. | |
| 7,728,489 B2 | 6/2010 | Heinz et al. | |
| 7,753,659 B2 | 7/2010 | Boyl-Davis et al. | |
| 7,849,833 B2 | 12/2010 | Toyoda | |
| 7,880,193 B2 | 2/2011 | Lam | |
| 7,886,993 B2 | 2/2011 | Bachmaier et al. | |
| 7,898,258 B2 | 3/2011 | Neuberth et al. | |
| 7,918,212 B2 | 4/2011 | Verdejo et al. | |
| 7,938,102 B2 | 5/2011 | Sherry | |
| 7,942,136 B2 | 5/2011 | Lepsch et al. | |
| 8,069,836 B2 | 12/2011 | Ehresman | |
| 8,091,528 B2 | 1/2012 | McAlister | |
| 8,297,265 B2* | 10/2012 | McAlister et al. | 123/578 |
| 8,301,358 B2* | 10/2012 | Kurtz | 701/105 |
| 8,387,599 B2* | 3/2013 | McAlister | 123/675 |
| 8,412,442 B2* | 4/2013 | Kurtz | 701/108 |
| 2002/0017573 A1 | 2/2002 | Sturman | |
| 2002/0046729 A1 | 4/2002 | Kyuuma et al. | |
| 2002/0070267 A1 | 6/2002 | Okamura et al. | |
| 2002/0084793 A1 | 7/2002 | Hung et al. | |
| 2002/0131171 A1 | 9/2002 | Hung | |
| 2002/0131666 A1 | 9/2002 | Hung et al. | |
| 2002/0131673 A1 | 9/2002 | Hung | |
| 2002/0131674 A1 | 9/2002 | Hung | |
| 2002/0131686 A1 | 9/2002 | Hung | |
| 2002/0131706 A1 | 9/2002 | Hung | |
| 2002/0131756 A1 | 9/2002 | Hung | |
| 2002/0141692 A1 | 10/2002 | Hung | |
| 2002/0150375 A1 | 10/2002 | Hung et al. | |
| 2002/0151113 A1 | 10/2002 | Hung et al. | |
| 2002/0166536 A1 | 11/2002 | Hitomi et al. | |
| 2003/0012985 A1 | 1/2003 | McAlister | |
| 2003/0042325 A1 | 3/2003 | D'Arrigo | |
| 2003/0127531 A1 | 7/2003 | Hohl | |
| 2004/0008989 A1 | 1/2004 | Hung | |
| 2004/0256495 A1 | 12/2004 | Baker et al. | |
| 2005/0045146 A1 | 3/2005 | McKay et al. | |
| 2005/0045148 A1 | 3/2005 | Katsuragawa et al. | |
| 2005/0081805 A1 | 4/2005 | Novotny | |
| 2005/0098663 A1 | 5/2005 | Ishii | |
| 2005/0255011 A1 | 11/2005 | Greathouse et al. | |
| 2005/0257776 A1 | 11/2005 | Bonutti | |
| 2006/0005738 A1 | 1/2006 | Kumar | |
| 2006/0005739 A1 | 1/2006 | Kumar | |
| 2006/0016916 A1 | 1/2006 | Petrone et al. | |
| 2006/0037563 A1 | 2/2006 | Raab et al. | |
| 2006/0102140 A1 | 5/2006 | Sukegawa et al. | |
| 2006/0108452 A1 | 5/2006 | Anzinger et al. | |
| 2006/0169244 A1 | 8/2006 | Allen | |
| 2007/0034175 A1 | 2/2007 | Higgins | |
| 2007/0142204 A1 | 6/2007 | Park et al. | |
| 2007/0189114 A1 | 8/2007 | Reiner et al. | |
| 2007/0277775 A1 | 12/2007 | Orlosky | |
| 2007/0283927 A1 | 12/2007 | Fukumoto et al. | |
| 2008/0072871 A1 | 3/2008 | Vogel et al. | |
| 2008/0081120 A1 | 4/2008 | Van Ooij et al. | |
| 2008/0098984 A1 | 5/2008 | Sakamaki | |
| 2008/0103672 A1 | 5/2008 | Ueda et al. | |
| 2008/0289606 A1 | 11/2008 | Bahnev | |
| 2009/0078798 A1 | 3/2009 | Gruendl et al. | |
| 2009/0093951 A1 | 4/2009 | McKay et al. | |
| 2009/0204306 A1 | 8/2009 | Goeke et al. | |
| 2009/0223480 A1 | 9/2009 | Sleiman et al. | |
| 2009/0264574 A1 | 10/2009 | Van Ooij et al. | |
| 2010/0020518 A1 | 1/2010 | Bustamante | |
| 2010/0024381 A1* | 2/2010 | Ackermann et al. | 60/39.17 |
| 2010/0043758 A1 | 2/2010 | Caley | |
| 2010/0077986 A1 | 4/2010 | Chen | |
| 2010/0108023 A1 | 5/2010 | McAlister | |
| 2010/0183993 A1 | 7/2010 | McAlister | |
| 2011/0036309 A1 | 2/2011 | McAlister | |
| 2011/0042476 A1 | 2/2011 | McAlister | |
| 2011/0048371 A1 | 3/2011 | McAlister | |
| 2011/0048374 A1 | 3/2011 | McAlister | |
| 2011/0048381 A1 | 3/2011 | McAlister | |
| 2011/0056458 A1 | 3/2011 | McAlister | |
| 2011/0057058 A1 | 3/2011 | McAlister | |
| 2011/0132319 A1 | 6/2011 | McAlister | |
| 2011/0134049 A1 | 6/2011 | Lin et al. | |
| 2011/0146619 A1 | 6/2011 | McAlister | |
| 2011/0210182 A1 | 9/2011 | McAlister | |
| 2011/0233308 A1 | 9/2011 | McAlister | |
| 2011/0253104 A1 | 10/2011 | McAlister | |
| 2012/0037100 A1* | 2/2012 | McAlister et al. | 123/41.02 |
| 2012/0097138 A1* | 4/2012 | Keating | 123/568.11 |

FOREIGN PATENT DOCUMENTS

| | | |
|---|---|---|
| EP | 671555 | 9/1995 |
| EP | 1972606 | 9/2008 |
| GB | 1038490 A | 8/1966 |
| JP | 56-083516 | 7/1981 |
| JP | 61-023862 A | 2/1986 |
| JP | 02-259268 A | 10/1990 |
| JP | 02-264124 | 10/1990 |
| JP | 08-049623 A | 2/1996 |
| JP | 08-334077 | 12/1996 |
| JP | 03-115742 B2 | 12/2000 |
| JP | 03-115743 B2 | 12/2000 |
| JP | 2004-324613 A | 11/2004 |
| KR | 2007-0026296 A | 3/2007 |
| KR | 2008-0073635 A | 8/2008 |
| RU | 2101526 C1 | 1/1998 |
| WO | WO-2008-017576 | 2/2008 |

OTHER PUBLICATIONS

"P dV's Custom Data Acquisition Systems Capabilities." PdV Consulting. Accessed: Jun. 28, 2010. Printed: May 16, 2011. <http://www.pdvconsult.com/capabilities%20-%20daqsys.html>. pp. 1-10.

"Piston motion equations." Wikipedia, the Free Encyclopedia. Published: Jul. 4, 2010. Accessed: Aug. 7, 2010. Printed: Aug. 7, 2010. <http://en.wikipedia.org/wiki/Dopant>. pp. 1-6.

"Piston Velocity and Acceleration." EPI, Inc. Accessed: Jun. 28, 2010. Printed: May 16, 2011. <http://www.epi-eng.com/piston_engine_technology/piston_velocity_and_acceleration.htm>. pp. 1-3.

"SmartPlugs—Aviation." SmartPlugs.com. Published: Sep. 2000. Accessed: May 31, 2011. <http://www.smartplugs.com/news/aeronews0900.htm>. pp. 1-3.

Bell et al. "A Super Solar Flare." NASA Science. Published: May 6, 2008. Accessed: May 17, 2011. <http://science.nasa.gov/science-news/science-at-nasa/2008/06may_carringtonflare/>. pp. 1-5.

Birchenough, Arthur G. "A Sustained-arc Ignition System for Internal Combustion Engines." Nasa Technical Memorandum (NASA TM-73833). Lewis Research Center. Nov. 1977. pp. 1-15.

Britt, Robert Roy. "Powerful Solar Storm Could Shut Down U.S. for Months—Science News | Science & Technology | Technology News—FOXNews.com." FoxNews.com, Published: Jan. 9, 2009. Accessed: May 17, 2011. <http://www.foxnews.com/story/0,2933,478024,00.html>. pp. 1-2.

Brooks, Michael. "Space Storm Alert: 90 Seconds from Catastrophe." NewScientist. Mar. 23, 2009. pp. 1-7.

Doggett, William. "Measuring Internal Combustion Engine In-Cylinder Pressure with LabVIEW." National Instruments. Accessed: Jun. 28, 2010. Printed: May 16, 2011. <http://sine.ni.com/cs/app/doc/p/id/cs-217>. pp. 1-2.

Hodgin, Rick. "NASA Studies Solar Flare Dangers to Earth-based Technology." TG Daily. Published: Jan. 6, 2009. Accessed: May 17, 2011. <http://www.tgdaily.com/trendwatch/40830-nasa-studies-solar-flare-dangers-to-earthbased-technology>. pp. 1-2.

InfraTec GmbH. "Evaluation Kit for FPI Detectors | Datasheet—Detector Accessory." 2009. pp. 1-2.

Lewis Research Center. "Fabry-Perot Fiber-Optic Temperature Sensor." NASA Tech Briefs. Published: Jan. 1, 2009. Accessed: May 16, 2011. <http://www.techbriefs.com/content/view/2114/32/>.

(56) References Cited

OTHER PUBLICATIONS

Pall Corporation, Pall Industrial Hydraulics. "Increase Power Output and Reduce Fugitive Emissions by Upgrading Hydrogen Seal Oil System Filtration." 2000. pp. 1-4.

Riza et al. "All-Silicon Carbide Hybrid Wireless-Wired Optics Temperature Sensor Network Basic Design Engineering for Power Plant Gas Turbines." International Journal of Optomechatronics, vol. 4, Issue 1. Jan. 2010. pp. 83-91.

Riza et al. "Hybrid Wireless-Wired Optical Sensor for Extreme Temperature Measurement in Next Generation Energy Efficient Gas Turbines." Journal of Engineering for Gas Turbines and Power, vol. 132, Issue 5. May 2010. pp. 051601-1-51601-11.

Salib et al. "Role of Parallel Reformable Bonds in the Self-Healing of Cross-Linked Nanogel Particles." Langmuir, vol. 27, Issue 7. 2011. pp. 3991-4003.

Erjavec, Jack. "Automotive Technology: a Systems Approach, vol. 2." Thomson Delmar Learning. Clifton Park, NY. 2005. p. 845.

Hollembeak, Barry. "Automotive Fuels & Emissions." Thomson Delmar Learning. Clifton Park, NY. 2005. p. 298.

International Search Report and Written Opinion for PCT Application No. PCT/US2012/050669; Applicant: McAlister Technologies, LLC; Date of Mailing: Feb. 28, 2013; 10 pages.

\* cited by examiner

SYSTEMS AND METHODS FOR IMPROVED ENGINE COOLING AND ENERGY GENERATION

CROSS-REFERENCE TO RELATED APPLICATION(S)

The present application claims priority to and the benefit of U.S. Provisional Patent Application No. 61/523,157, filed Aug. 12, 2011, and entitled "SYSTEMS AND METHODS FOR IMPROVED ENGINE COOLING AND ENERGY GENERATION," the entirety of which is incorporated by reference herein.

TECHNICAL FIELD

The following disclosure relates generally to systems and methods for operating a combustion engine at higher efficiencies by injecting a working fluid into a combustion chamber to cool the combustion chamber enabling weight reduction and maintenance reduction of a conventional internal combustion engine cooling system and enabling the ability to generate energy in a subsequent engine.

BACKGROUND

Conventional combustion engines generate energy, and a natural byproduct of combustion engines is heat. Existing combustion engines are designed to waste most of the heat released by combustion and to convert a relatively smaller portion into useful work. Wasted heat must be rejected through a water-jacket, air-cooling fins and through the exhaust gases that are expelled. Overheating of combustion chamber components such as the piston assembly, cylinder, intake and exhaust valves causes increased friction, interference and failure if not properly prevented. Heat must be removed from the combustion chamber components, so typical engine systems include heavy, bulky cooling mechanisms such as cooling fins, cooling jackets, and other structures that remove heat from the combustion engine. However, these components merely remove heat, and do not satisfactorily convert the thermal energy into useful work. There exists a need for improved methods of heat management and conservation for combustion engines. There further exists a need to reduce or eliminate the parasitic load required by traditional cooling systems with its consequent life-of-engine cost in terms of fuel consumption, maintenance of common problems (leaks, corrosion, parts replacement, etc.) and increased greenhouse gas emissions.

DETAILED DESCRIPTION

Figure 1:
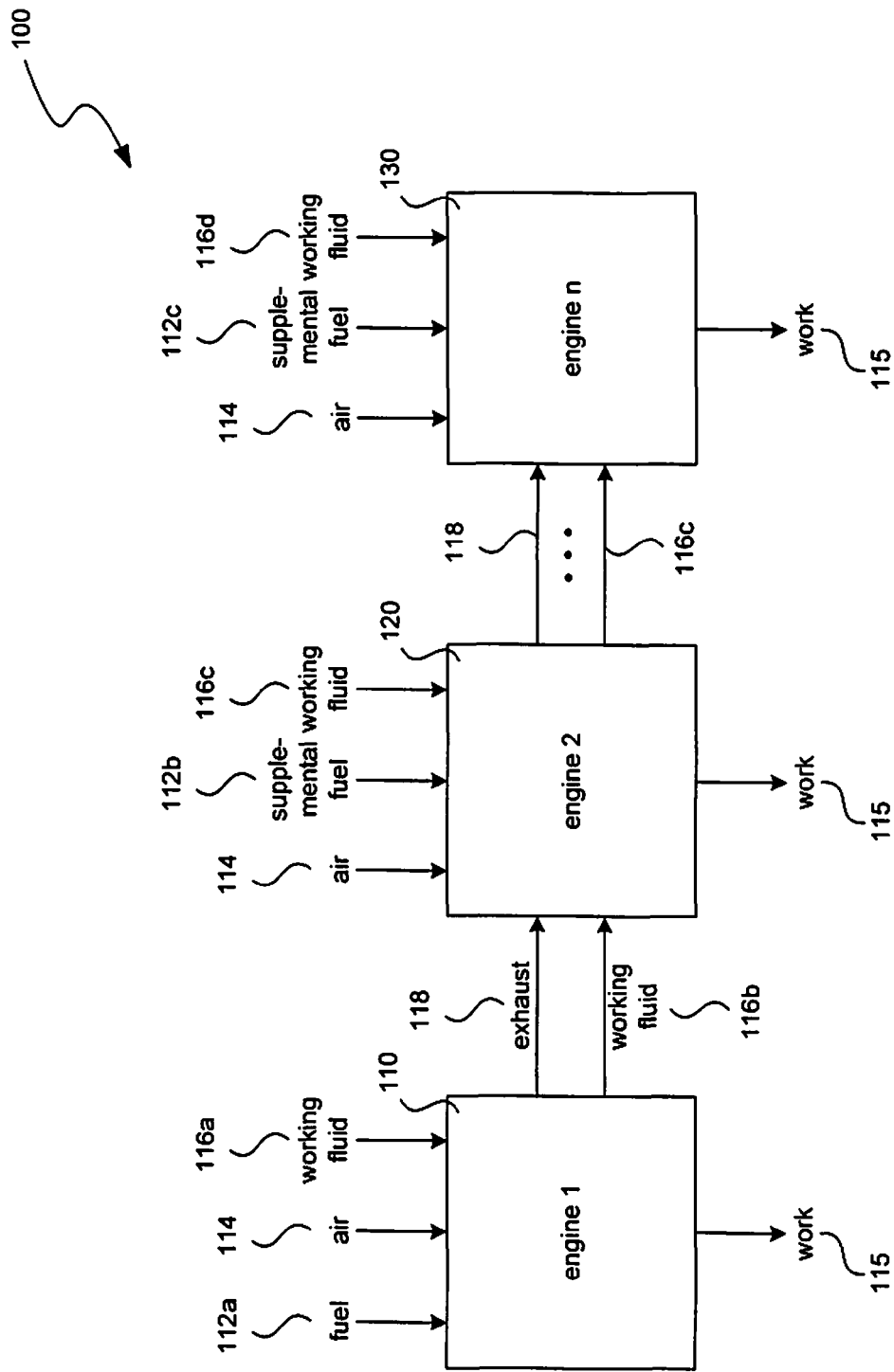
FIG. 1 is a schematic illustration of a combustion engine and a series of secondary engines configured in accordance with embodiments of the present disclosure.

The present technology is generally directed toward systems and methods of improved engine cooling and energy generation. In some embodiments, the systems and methods include a combustion engine having one or more combustion chambers in which fuel and air are burned to produce energy. The operation of the combustion chambers can include an Otto cycle, a diesel cycle, or any other suitable energy cycle. In general, these energy cycles include a piston and a crankshaft in a cylinder of an engine. The combustion of fuel and air produces hot combustion gases that expand and as the piston moves and generates torque on the crankshaft.

In some embodiments of the present technology, a working fluid is injected into the combustion chamber during any portion of the combustion cycle to cool the combustion chamber and also to produce work. The working fluid can generally be any type of fluid. Examples include water, methanol, ammonia, and any other suitable fluid including gaseous fuels. Cooling the combustion chamber using a working fluid inside the combustion chamber can replace other cooling structures, such as fins or cooling jackets, or other bulkier, heavier cooling structures that are conventionally used to cool engine chambers externally. Cooling the engine from the interior can be superior to cooling from the exterior at least because the heat is produced inside the combustion chamber, so the heat does not need to be transferred through the material of the combustion chamber before being removed. The systems and methods of the present technology allow an engine to be lighter and smaller than a comparable engine with conventional exterior cooling structures, at least for the simple benefit that the vehicle carries less engine weight and requires less engine space by eliminating such structures.

The engine can include one or more combustion chambers. For example, an automobile engine generally includes 4, 6, or 8 cylinders, each comprising a self-contained combustion chamber. In some embodiments of the present technology, each individual combustion chamber can be monitored, and a controller can introduce the working fluid into individual chambers as needed to control the temperature of critical components of individual combustion chambers substantially independently of the remaining chambers.

The working fluid can also be used to generate useful work in the engine, for example, by gaining heat energy to perform expansive work including selections of working fluid that change phase from a liquid to a gas and thereby exerts pressure on the piston in the chamber. The working fluid can include water that will vaporize upon gaining heat in the hot combustion chamber, and the hot steam can move the piston to produce work. The working fluid can also produce work in a subsequent engine after passing through the combustion chamber. For example, the working fluid can be fuel that is not fully consumed in the combustion chamber and is passed to a subsequent engine for expansion and/or combustion and energy production in the subsequent engine. Combustion can be prevented by injecting large quantities of fuel e.g., more than for a combustion event and/or by recirculation of exhaust gases or by other methods for withholding oxygen from the combustion chamber. The fuel will be heated by cooling critical components of the combustion chamber and can be activated for combustion and/or other useful consumption in the subsequent engine. In some embodiments, the working fluid can contain a reagent that can be mixed with fuel, air, and other substances introduced into the combustion chamber. For example, ammonia, glycol, or other substances can be used to facilitate ignition, combustion and/or cooling of the engine chamber. In some embodiments, the reagent can be used to pilot the combustion, assist a diesel cycle, or assist a plasma generation system.

Certain details are set forth in the following description and in FIGS. 1-6 to provide a thorough understanding of various embodiments of the disclosure. However, other details describing well-known structures and systems often associated with internal combustion engines, injectors, igniters, and/or other aspects of combustion systems are not set forth below to avoid unnecessarily obscuring the description of various embodiments of the disclosure. Thus, it will be appreciated that several of the details set forth below are provided to describe the following embodiments in a manner sufficient to enable a person skilled in the relevant art to make and use the disclosed embodiments. Several of the details and advantages described below, however, may not be necessary to practice certain embodiments of the disclosure.

Many of the details, dimensions, angles, shapes, and other features shown in the Figures are merely illustrative of particular embodiments of the disclosure. Accordingly, other embodiments can have other details, dimensions, angles, and features without departing from the spirit or scope of the present disclosure. In addition, those of ordinary skill in the art will appreciate that further embodiments of the disclosure can be practiced without several of the details described below.

Reference throughout this specification to "one embodiment" or "an embodiment" means that a particular feature, structure, or characteristic described in connection with the embodiment is included in at least one embodiment of the present disclosure. Thus, the occurrences of the phrases "in one embodiment" or "in an embodiment" in various places throughout this specification are not necessarily all referring to the same embodiment. Furthermore, the particular features, structures, or characteristics described with reference to a particular embodiment may be combined in any suitable manner in one or more embodiments. Moreover, the headings provided herein are for convenience only and do not interpret the scope or meaning of the claimed disclosure.

FIG. 1 is a schematic illustration of a working fluid delivery system 100 according to the present technology. In some embodiments the system 100 includes a first engine 110, a second engine 120, and a third engine 130. The third engine 130 is labeled as "Engine n" because the system 100 can include any number of engines. However, for purposes of illustration, a first engine 110, second engine 120 and third engine 130 are shown. In some embodiments the first engine 110 can include an internal combustion engine that receives fuel 112a, air 114 and a working fluid 116a into a combustion chamber. As with conventional combustion chambers, the first engine 110 can burn the fuel 112a and the air 114 to produce a combustion event. The engine 110 can operate with fuel 112a and air 114 under normal conditions until the temperature, pressure, or another variable causes a need for an injection of working fluid 116a. A working fluid 116a can be injected into a combustion chamber of the first engine 110 to cool the engine 110 and also to produce useful work 115. The work 115 can come from the combustion event, or from the working fluid 116a, or a combination of the two. The working fluid 116a can be a coolant fluid such as water, or a combustible substance such as ammonia, ethanol, methanol, gasoline, or any suitable fluid in any suitable mixture.

The first engine 110 can output an exhaust 118 from the engine which can be sent into the atmosphere, and/or passed forward into the second engine 120. The working fluid 116b, now hot from the combustion event and possibly in a different phase (e.g., gas), can be passed forward into the second engine 120. The working fluid 116b may be altered chemically or otherwise as a result of passing through the first engine 110. In some embodiments, the working fluid 116b is chosen according to how passing through the hot combustion chamber of the first engine 110 will affect the working fluid 116b. In addition, different temperatures, pressures, and chemical constituencies within the combustion chamber may call for a selection from among various possible working fluids, or for some appropriate mixture of two or more working fluids, as suitable for use in the second engine 120.

The second engine 120 can also receive air 114, supplemental fuel 112b, and additional working fluid 116c. The working fluid 116c can be similar to the working fluid 116a first injected into the first engine 110, or the working fluid 116b produced in the first engine 110, or it can be a new species of working fluid. In some embodiments, the second engine 120 may be generally similar to the first engine 110 and can expand the fluid it receives and/or burn fuel, air and/or other substances in a series of combustion events to produce useful work 115. In other embodiments the second engine 120 is provided with another type of fuel generation system, including a thermo-chemical regeneration ("TCR") system as described more fully in U.S. patent application Ser. No. 13/027,208 entitled, "CHEMICAL PROCESSES AND REACTORS FOR EFFICIENTLY PRODUCING HYDROGEN FUELS AND STRUCTURAL MATERIALS, AND ASSOCIATED SYSTEMS AND METHODS," filed Feb. 14, 2011, which is incorporated herein by reference in its entirety. The second engine can also be a turbine, can be a fuel cell, or an auxiliary system of the vehicle such an air conditioning system or an electricity generation system or any other auxiliary system. The third engine 130 can similarly receive exhaust and/or working fluid 116c from the second engine 120, supplemental air 114, fuel 112c, and/or working fluid 116d, and so on in a cascading series of engines. Each of the engines 110, 120, or 130 can produce useful work from expansion of a working fluid and/or a combustion event, the working fluid expanding and/or changing phase, or any combination of such energy conversion events.

Figure 2:
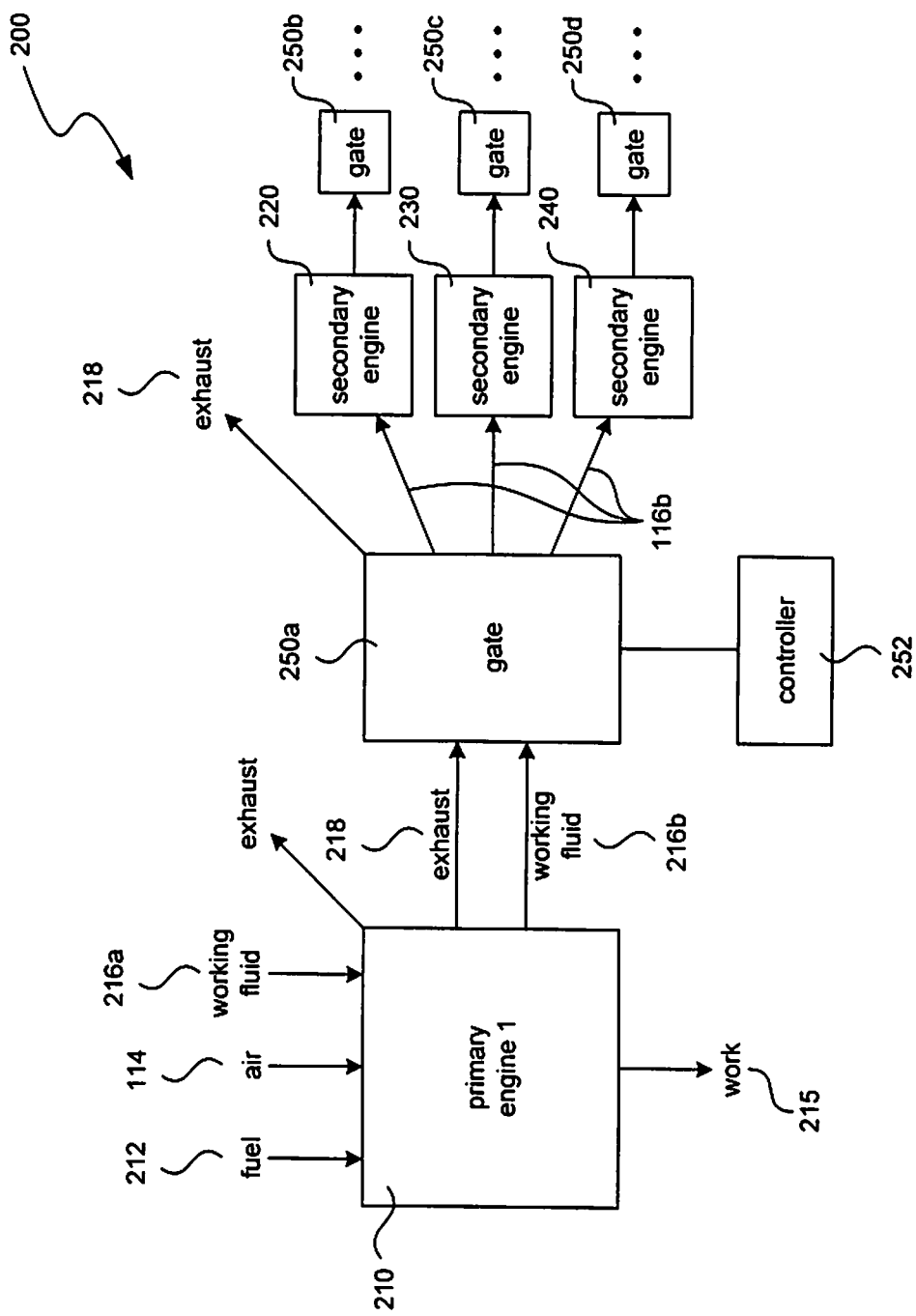
FIG. 2 is a schematic illustration of an engine and a gate for directing a working fluid and exhaust to one or more secondary engines configured in accordance with embodiments of the present disclosure.

FIG. 2 is a schematic illustration of a further working fluid delivery system 200 according to embodiments of the present technology. The system 200 can include in a first or primary engine 210, a gate 250a, a second engine 220, a third engine 230, and a fourth engine 240; each having respective gates, 250b, 250c, and 250d. The engines 220, 230, and 240 can be any type of engine, including a fuel cell, turbine, TCR unit or any suitable energy conversion system. The engines 220, 230, and 240 are collectively referred to herein as secondary engines. It is to be appreciated that the system 200 can include any number of engines (primary or secondary) and gates in any suitable combination or series. As described above with respect to FIG. 1, the engine 210 can receive fuel 212, air 214, and a working fluid 216a and can combine these components and in a combustion cycle, can produce useful work 215. The gate 250a can receive the working fluid 216b and the exhaust 218 from the engine 210, and can adaptively direct the exhaust 218 and the working fluid 216b to the second engine 220, third engine 230, fourth engine 240, or as exhaust to the atmosphere. It is to be appreciated that any number of engines can be included in the system 200.

The system 200 can also include a controller 252 operably coupled to the gate 250a that can direct the fluids adaptively between the various engines as needed by the system 200. In some embodiments, the controller 252 can monitor conditions in the various engines and distribute the working fluid 216b among the engines as appropriate. In some embodiments, the controller 252 can include a predetermined delivery schedule. In other embodiments, the controller 252 can operate reactively based on sensed conditions within various combustion chambers and as needed by a given secondary engine under a given load. For example, the engine 210 may be used in various different environments and at different operating levels, and will produce varying amounts of working fluid, different temperatures and pressures, and different characteristics within the combustion chambers of the engine 210. The working fluid 216b and exhaust produced at differing loads can be adaptively distributed advantageously to the secondary engines. In one embodiment, the second engine 220 may operate more efficiently on cooler working fluid 216b that is produced when the engine 210 operates at a relatively low level. Conversely, the third engine 230 may run more efficiently on the type of working fluid 216b and exhaust 218 produced by the first engine 210 when the first engine 210 operates at a very high level. Also, the load on any of the secondary engines may dictate the type and/or quantity of working fluid 216b delivered by the gate 250a. The controller 252 can include a priority listing of the engines 210 to resolve competing demands for resources.

Figure 3:
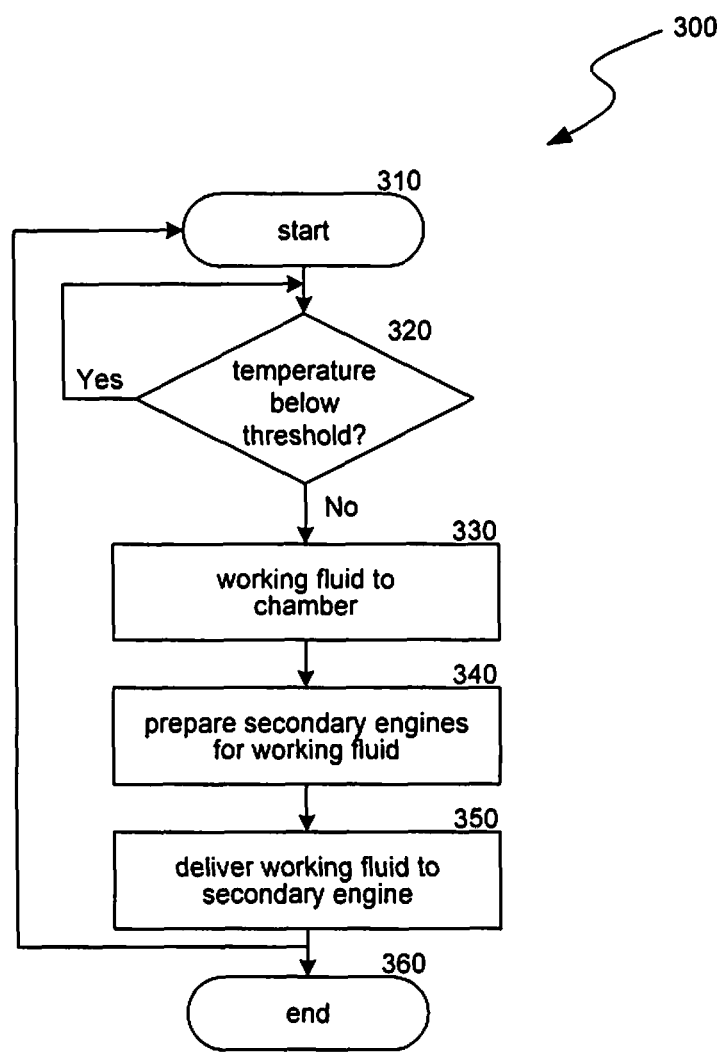
FIG. 3 is a flowchart of a method for monitoring a process within a combustion engine and delivering a working fluid to the combustion engine according to embodiments of the present disclosure.

FIG. 3 is a flowchart describing a method 300 of monitoring a process within a combustion engine and delivering a working fluid according to embodiments of the present technology. The method 300 can be practiced with a sensing system for a combustion event as described more fully in U.S. patent application Ser. No. 13/027,170 entitled, "METHODS AND SYSTEMS FOR ADAPTIVELY COOLING COMBUSTION CHAMBERS IN ENGINES," filed Feb. 14, 2011, which is incorporated herein by reference in its entirety. The sensing system can monitor many variables such as pressure, temperature, acoustic energy, optical measurements, and chemical conditions can be monitored within a combustion chamber. After initializing at step 310, at 320 a decision is made regarding a measured characteristic within a given combustion chamber. For example, at step 320 a temperature of selected objects within a combustion chamber can be measured and compared to a threshold temperature. If the temperature is safely below the threshold temperature, nothing is done until a next measurement is made. During operation of the engine, the temperature will vary. Temperature measurement may be continuous or the next measurement can be made after waiting a predetermined time period, the length of which can depend on the load, the environment, and other factors. In some embodiments, the predetermined time period between measurements can be fractions of a second, so the measurements are nearly instantaneous.

Eventually, the temperature will rise above the threshold. Step 330 includes delivering working fluid to the combustion chamber to cool the combustion chamber. The type, amount, and timing of the working fluid delivery can vary adaptively to optimize heat to work energy conversion purposes depending on other measured factors and design preferences. Step 340 includes preparing subsequent engines to receive the working fluid as it flows downstream from a primary engine to a secondary engine. There is a slight lag between delivery to the primary engine and when the working fluid arrives at the secondary engine(s). In some embodiments, the status of the secondary engines can also be monitored. If there is an event requiring immediate delivery of working fluid or any other fluid where the lag is unacceptable, the working fluid can be delivered directly to the secondary engine as capabilities of a given configuration permit. At 350 the working fluid is delivered to the subsequent engine, and the method 300 can terminate at Step 360 or repeat. In some embodiments, the sampling rate of the measurements can be sufficiently high that the conditions in the primary and secondary engines are monitored substantially in real time. According to the method 300, an engine can monitor temperature within individual combustion chambers, and using a controller or other control techniques, can carefully control the temperature of the engine and prevent each individual combustion chamber from exceeding a predetermined temperature limit, pressure limit, or another measured characteristic having a safe or desirable limit. Two or more measured characteristics can be measured together in step 320. For example, temperature and pressure are generally related phenomena, as excessively high temperatures at high pressure are generally more concerning than high temperatures alone. Other combinations of variables can also trigger a delivery of working fluid to diffuse a situation.

In some embodiments, at step 320 the decision can be based on a rate of temperature change as well as a value of temperature change. For example, if the difference between any two samplings of the temperature is greater than a threshold value, the method 300 can include inferring that the temperature is rising quickly and is likely to continue to rise. Accordingly, in some embodiments, even if the temperature is lower and is still within the acceptable range, if based on the current trend in the temperature and the engine it is likely that the temperature will exceed the threshold, the working fluid can be introduced into the chamber to cool the engine.

In operation of conventional systems, the result of combusting a fuel in a conventional engine is that air or liquid is cooled by conduction of heat from the combustion chamber to exterior subsystems such as cooling fins, liquid coolants circulated by pumps to a fan cooled radiator, etc. The overall efficiency of converting the heat released by combustion into work delivered by the output shaft is typically about 28%. Thus the traditional cooling system and exhaust systems reject 72% of the heat released by combustion of which about 35 to 40% is removed by the air and/or liquid cooling system.

In operation of the present system, the energy which is wasted from the combustion chamber by air and/or liquid cooling circulated in circuits outside of the combustion chamber is reduced or eliminated. This is accomplished by engine operation with a working fluid such as water that is injected during the power stroke or work-producing cycle of operation. The working fluid removes heat from the combustion chamber to provide desired cooling and performs expansive work to replace the combustion of fuel as provided in each of the preceding five complete engine cycles. Thus at the particular power level illustrated, an average of one in six complete engine cycles produces the same amount of power without fuel combustion. Reduction in fuel consumption is gained from expansion of a working fluid that cools the combustion chamber and performs work on an average of one cycle out of six.

At higher power levels, commensurately greater fuel savings are achieved by operation of the virtually instantaneous response power-cooling cycle to remove the greater amount of heat as required on an average of every 5th, 4th, or 3rd cycle. Compared to conventional engine operation, additional performance improvements along with fuel savings are achieved by elimination of conventional parasitic losses including:
    cooling fan operation
    water pump drive propulsion of the additional masses including cooling jacket and/or fin materials, inventory of coolant, coolant overflow tank, coolant overflow tank filter system, coolant hoses to and from the cooling jacket of the engine, coolant hose connectors and fittings, thermostat housing, thermostat, water pump, water pump drive belt idler-tensioner assembly, radiator, radiator shroud, air fan, fan drive belt, fan belt idler-tensioner assembly, etc.;

drag caused by frontal area required (or equivalent fan energy required) to dissipate 35 to 40% of the heat released by the fuel combustion as required by conventional subsystems to minimize the thermal cycling degradation of the combustion chamber materials.

Another embodiment reduces or eliminates the energy removed from the combustion chamber by air and/or liquid cooling by operation with a working fluid selected from options such as water, a mixture of water and fuel or un-ignited and/or surplus fuel that removes heat from the combustion chamber and performs work by expansion. In instances that fuel potential is exhausted from the first engine, it may be combusted to provide heat that is utilized by another engine that operates in conjunction with the first engine and/or such heat may drive endothermic reactions in a TCR system.

Embodiments that utilize a combination of engines provide numerous advantages including:

Larger potential turn-down ratio by various selections of operational permutations to meet a larger variety of power requirements Additional mass flow of expansive working fluid coolant from first engine to the second engine enables greater work capacity and higher efficiency by the second engine.

Much faster response provided by direct injection of non-combustible coolant working fluid and/or by operation with a fuel selection without ignition and/or operation of the first engine with a cooling cycle based on incomplete combustion resulting from adaptive ignition timing control and/or the use of surplus fuel enables much greater power production than allowed by conventional cooling systems.

In certain embodiments of the systems described herein, a piston or rotary combustion primary engine is combined with a second engine such as a piston, rotary, or turbine expander or engine. Upon receiving a demand for more power and/or for a cooling process of the first engine, a coolant selected from the group including water, a mixture of fuel and water, and non-aqueous liquids is injected by injector-igniter and/or into the combustion chamber during the power and/or exhaust cycles of a complete cycle that includes intake, compression, power and exhaust events. Ignition is eliminated or ignition timing is delayed to provide unburned fluid that performs the desired cooling of the first engine as it produces work and such fluid enters the second engine. The second engine has the advantage of the coolant flow from the first engine through conduit to produce a higher mass flow rate and injection-igniter ignites any fuel that arrives from engine and may receive and combust additional fuel to boost power production as provided by controller. Operation according to this operational permutation provides much higher mass flow and/or temperature to TCR.

Figure 4:
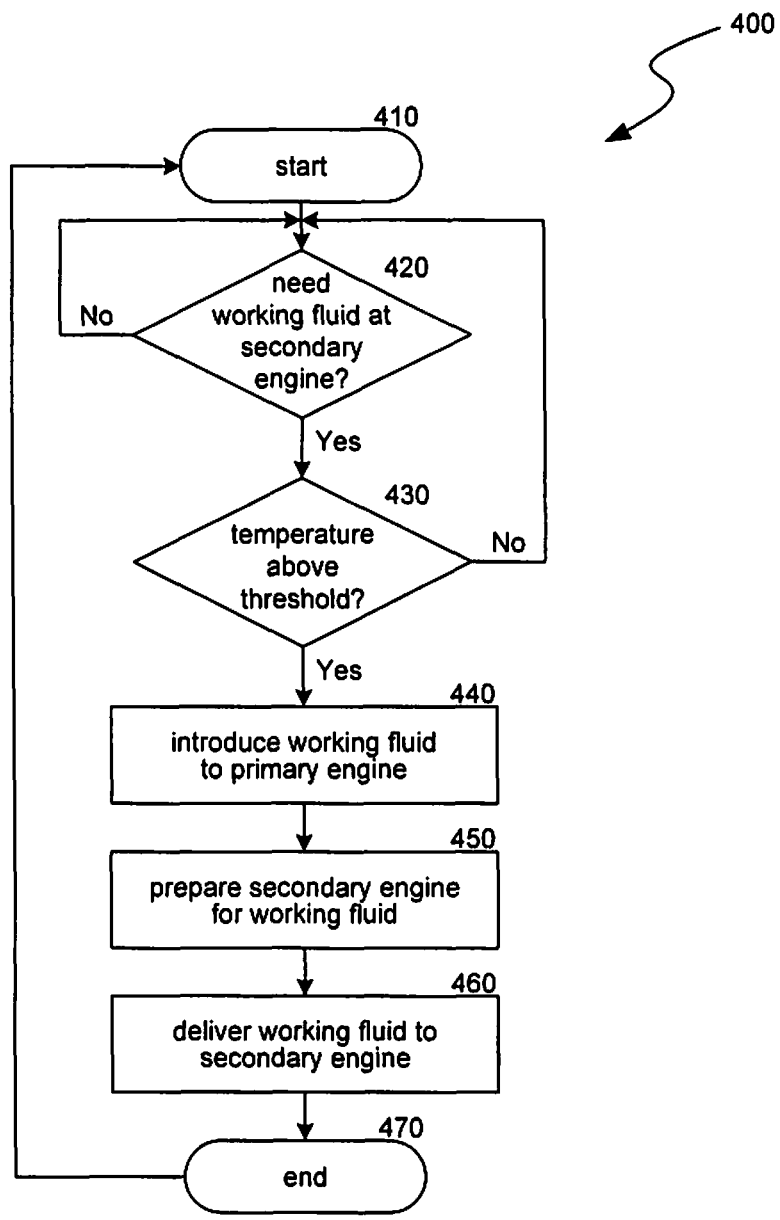
FIG. 4 is a flowchart of a method for monitoring a process within a primary combustion engine and delivering a working fluid as needed in a secondary engine according to embodiments of the present disclosure.

FIG. 4 illustrates a method 400 according to further embodiments of the present technology. After initiating at step 410, at step 420 a decision is made whether working fluid is needed at a primary or a secondary engine. The need can be based on a need for cooling, or to produce work based on the working fluid. As described above, the engines can be operatively arranged in a cascading series and the working fluid can be designed to cool any one or more of the engines, and to produce useful work at any one or more of the engines. For example, in some embodiments the working fluid includes a hydrogen-rich substance that is to provide hydrogen to a process in a secondary engine. If the secondary engine needs hydrogen from the working fluid, the method 400 can continue at step 430. At step 430 a decision is made whether or not the circumstances of the primary engine are such that delivering working fluid to the secondary engine through the primary engine would not harm or otherwise inhibit operation of the primary engine. For example, if the temperature in the combustion chamber needs to remain above some predetermined level, and introducing working fluid to the combustion chamber would lower the temperature below that threshold, the decision is no. If the decision is not to deliver working fluid through the primary engine, working fluid can be delivered directly to the secondary engine. Accordingly, the secondary engine can effectively be considered a primary engine for purposes of that working fluid flow. If the decision at step 420 and 430 is yes, step 440 can include introducing the working fluid to the primary engine and step 450 is preparing the secondary engines to receive the working fluid. At step 460 the fluid is delivered and at step 470 method ends and can repeat as needed. Similar to the method 300 discussed above with reference to FIG. 3, the sample rate of the method 400 can be very short, or as long as necessary for a given application.

Figure 5:
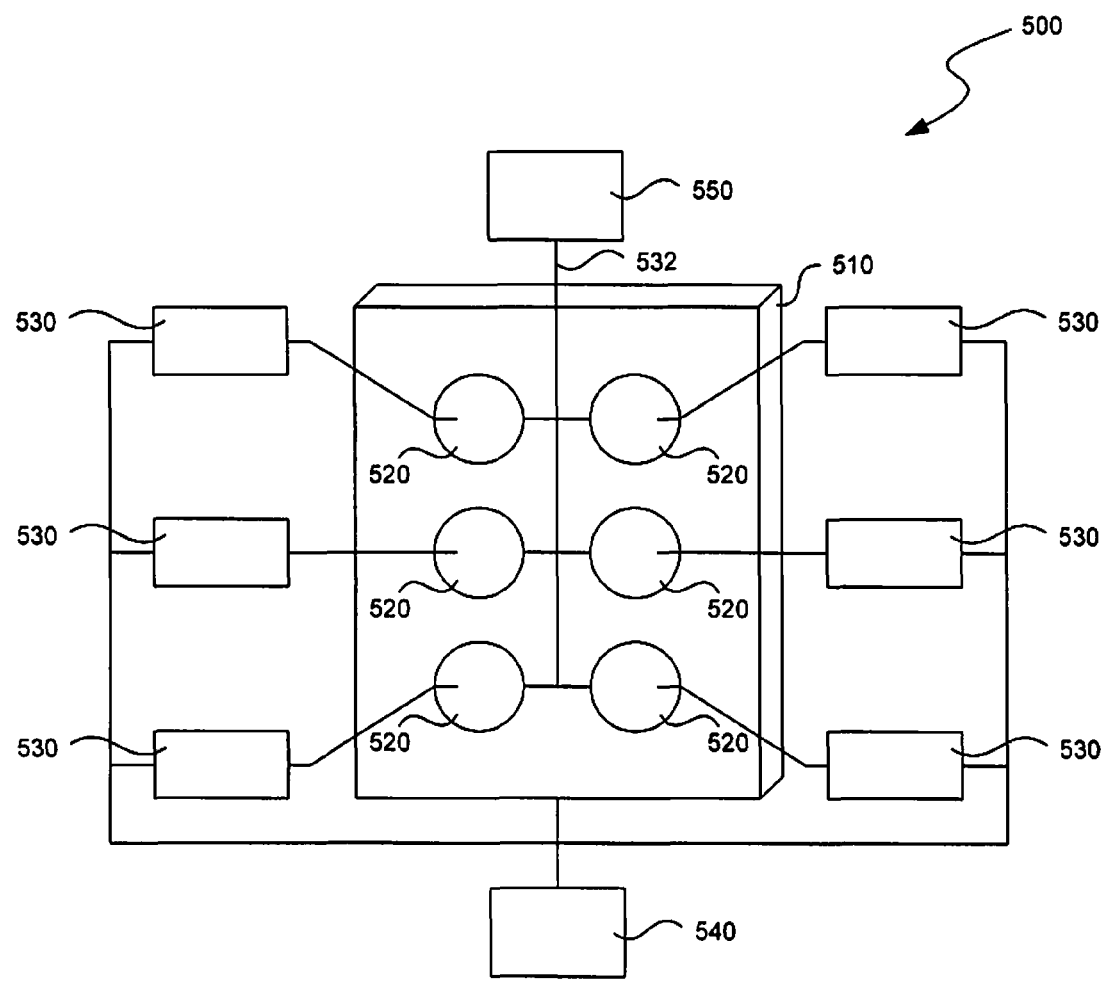
FIG. 5 is a partially schematic illustration of an engine having multiple cylinders, multiple sensors, and a controller configured in accordance with embodiments of the present disclosure.

FIG. 5 is a partially schematic illustration of an engine and sensor system configured according to embodiments of the present technology. The system 500 can include an engine 510 having a plurality of combustion chambers or cylinders 520. A fluid delivery source 530 can be configured to deliver fuel, air, and working fluid 550 through one or more pathways 532 to each of the combustion chambers or cylinders 520. The system 500 can also include a plurality of sensors 530 which can in some embodiments be individually coupled to combustion chambers 520, and connected to a controller 540. As described above, the individual combustion chambers 520 can be equipped with sensing mechanisms that can monitor conditions within the combustion chambers 520 such as temperature, pressure, chemical constituents, light, acoustic energy, oxidant and/or fuel introduction and combustion event timing and patterns and virtually any other measurable characteristic. As also described above, fuel, air and a working fluid can be introduced into the combustion chambers through direct injection or through indirect injection. In some embodiments, the sensors 530, and the controller 540 can monitor the combustion chambers 520 independently such that information such as the temperature and/or pressure etc., of each individual cylinder 520 can be monitored and the temperature and/or pressure can be controlled independent of other combustion chambers. For example, differing amounts of working fluid, fuel, air and other substances can be delivered to individual combustion chambers according to the temperature and/or pressure within each individual combustion chamber 520. Accordingly the heat production and the combustion event within the individual combustion chambers can be individually monitored which leads to a more efficient use of working fluid, including better control of temperature and/or pressure within the engine 510 as compared to conventional combustion control in engine operations.

Figure 6:
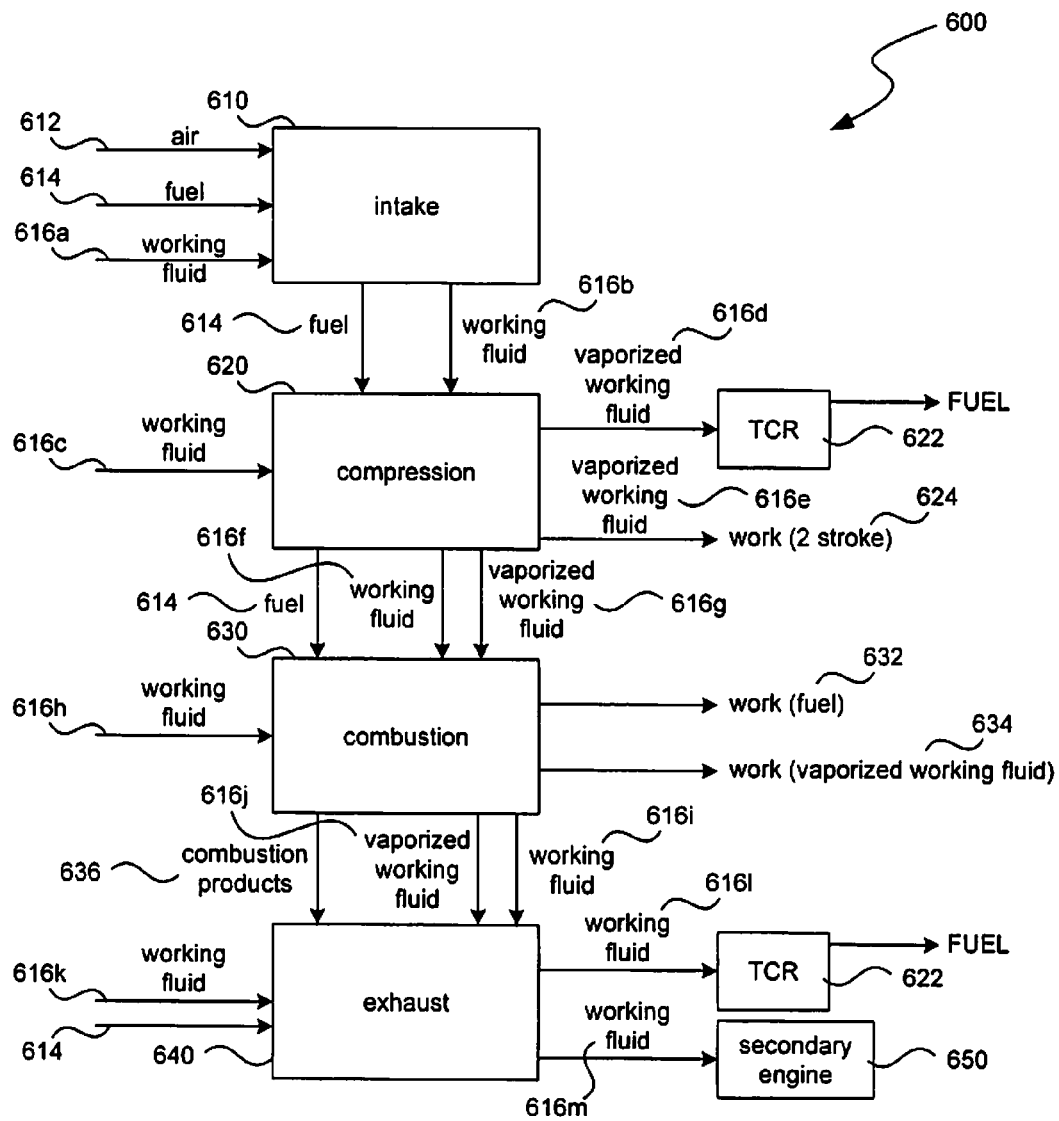
FIG. 6 is a schematic block diagram of a four stroke combustion cycle and working fluid injection timing configured in accordance with embodiments of the present disclosure.

FIG. 6 is a schematic block diagram of a four stroke combustion cycle and working fluid injection routine 600 configured in accordance with embodiments of the present disclosure. The description of the injection routine 600 includes many alternative methods and timings of injecting working fluid and other materials into the combustion chamber. It is to be appreciated that any suitable combination of these alternatives can be used according to the needs of a particular engine. The injection routine 600 can be performed in a single combustion chamber, or in several cooperative combustion chambers forming a single engine. The injection routine 600 can be performed generally independently in individual chambers of an engine.

The engine of the present disclosure can operate with a four-stroke combustion engine including an intake stroke 610, a compression stroke 620, a combustion stroke 630 and an exhaust stroke 640.

In the intake stroke 610, a combustion chamber having one or more intake and one or more exhaust valves and a piston generally involves a piston moving away from top dead center ("TDC") and toward bottom dead center ("BDC") so as to provide the maximum space for oxidant 612 (e.g., air) entry into the interior volume of the combustion chamber. Oxidant entry may be below, at, or above the ambient pressure of the atmosphere depending upon factors such as the impedance to air flow and application of oxidant inducing or pressurizing subsystems such as a blower or turbocharger (not shown). In some instances, other substances such as fuel 614 and/or another working fluid 616a are introduced along with the oxidant into the chamber. Illustratively, one or more fuel injectors can indirectly or directly inject fuel and/or other substances into the combustion chamber during the intake stroke 610.

The compression stroke 620 is generally when the piston moves from BDC back toward TDC so as to reduce the volume of the combustion chamber and increase pressure in the combustion chamber in preparation for a combustion event. During such compression one or more fuel injectors can inject fuel and/or other substances into the combustion chamber in the compression stroke 620. Similarly during the combustion or power stroke one or more fuel injectors can inject fuel and/or other substances into the combustion chamber in the combustion stroke 630. And, in the combustion stroke 630, the piston again moves from TDC back toward BDC to enlarge the volume of the combustion chamber under the pressure caused by one or more combustion events.

The exhaust stroke is similar to the compression stroke in that the piston moves from BDC to TDC so as to reduce the volume of the combustion chamber. During the exhaust stroke 640 one or more fuel injectors can inject fuel and/or other substances into the combustion chamber. In this stroke the residual combustion fluids and substances are removed from the chamber. The process can repeat continuously.

According to embodiments of the present disclosure, a fuel and/or another working fluid can be injected into the combustion chamber according to the injection routine 600 at any point in the four-stroke cycle as will be described herein in more detail. The individual working fluids 616a-616m referred to below generally relate to similar working fluids, altered in some way such as by heating, phase change, and/or phase change and/or respeciation such as ($CH_3OH + \Delta \rightarrow CO + 2H_2$). For example, a single quantity of working fluid may be described as working fluid 616a in one portion of the disclosure, but after passing through a process within the combustion chamber, the working fluid 616a has changed in some way and accordingly is now referred to as working fluid 616b, 616c, etc. The working fluids 616a-616m can be similar to the working fluids described above, including coolants or fuels or any other type of working fluid.

The fuel, working fluids, and other substances can be introduced into the combustion chamber by a fuel injector, such as an indirect injector or a direct injector. An indirect injector is one that injects fuel into an oxidant intake manifold or passageway or other port just outside the combustion chamber, and relies on positive pressure in the manifold or negative pressure in the chamber to draw the oxidant and fuel into the combustion chamber. A direct injector generally injects fuel and/or other substances into the combustion chamber directly, through a path independent from an air manifold or any other access point to the chamber. In some embodiments, one or more fuel injectors can include multiple independent paths through which different fluids and/or fluid mixtures can be injected into the combustion chamber independently. Examples of such fuel injectors are given in U.S. patent application Ser. No. 12/961,461 entitled, "INTEGRATED FUEL INJECTOR IGNITERS CONFIGURED TO INJECT MULTIPLE FUELS AND/OR COOLANTS AND ASSOCIATED METHODS OF USE AND MANUFACTURE," filed on Dec. 6, 2010, which is incorporated herein by reference in its entirety.

During the intake stroke 610, oxidant such as air 612, fuel 614, and a working fluid 616a can be introduced into the combustion chamber. Introducing the working fluid 616a into the combustion chamber at this stage of the process can be performed using indirect injection or direct injection. Accordingly, this portion of the routine 600 can be used in a retrofit installation using an existing combustion engine without a direct injection system as well as in an engine specifically designed for such a routine 600. Injecting working fluid during other portions of the energy cycle, such as the compression stroke 620, combustion stroke 630 or exhaust stroke 640, is preferably performed with a direct injector. The working fluid can cool components of the combustion chamber of an engine at any time such as during the intake stroke 610, compression stroke 620, power stroke 630, or exhaust stroke 640 and commensurately or subsequently (later) perform useful work as will be described below.

At the end of the intake stroke 610, the fuel 614 that has been introduced and/or working fluid 616b remain in the chamber into the compression stroke 620. In some embodiments, the working fluid 616b may now be heated due to exposure to elevated temperature components and/or compression induced heating within the combustion chamber. In other embodiments, the working fluid 616b can be changed chemically or otherwise by exposure to the heated combustion chamber, such as by releasing or preparing to release fuel components such as hydrogen, or by changing phase from a liquid to a gas.

Additional fuel and/or working fluid 616c can be introduced during the compression cycle 620. The working fluid 616c can be generally similar to the working fluid 616a, or it can have a different phase or chemical makeup. Due to exposure to heat in the combustion chamber, at least a portion of any liquid fuel and/or working fluid 616b has changed phase to a vapor or gas to perform work in the power cycle operation.

In some embodiments sufficient heat transfer and heating of fuel land/or other working fluids produces significant pressure in the power stroke that may be equal to or greater than the pressure due to combustion of fuel in conventional operations. This provides for fuel economy improvement by reducing or eliminating fuel delivery until such heat transfers are no longer useful and/or sufficient cooling of critical components has occurred. In other embodiments, controller 540 provides for maintenance of the temperature of critical components within a desired temperature range by injection of working fluid for performing such work producing and cooling events and benefits on a certain frequency such as every 3rd, 4th, 5th, . . . or Nth cyclic event such as in the power stroke.

Similarly, for purposes of cooling critical components, fuel and/or other working fluid substances can be injected during the exhaust stroke and the heated vapors or gases can be gated to one or more additional engines for combustion and/or expansive work production and/or the heated vapors or gases can be gated to one or more TCR units. In other embodiments, controller 540 provides for maintenance of the temperature of critical combustion chamber components within a desired temperature range by injection of fuel and/or working fluid for performing such cooling events and benefits on a certain frequency such as every 3rd, 4th, 5th, . . . or Nth cyclic event such as in the intake, compression, power and/or exhaust strokes.

By injection of fuel and/or working fluids for extracting heat to cool critical components of the combustion chamber work can be accomplished at times the piston is moving corresponding to crank shaft angles after TDC to BDC (including intake and power strokes) so the four-stroke cycle is effectively changed to a two-stroke cycle. For example, in some embodiments, fuel 614 and/or the working fluid 616a is introduced during the intake cycle including operation with restricted air intake that is normally delivered, to perform cooling and work production. Similarly during the combustion stroke 630, fuel 614 and/or working fluid 616h can be introduced to perform cooling and work production functions 632. The routine 600 can direct one or more combustion chambers in the engine to change at least temporarily to this two-stroke pattern, and when heat levels are again lowered to desirable levels, the routine 600 can restore the four-stroke pattern of intake, compression, combustion, and exhaust.

In certain embodiments as the engine cycle moves into the combustion stroke 630, some combination of fuel 614, working fluid 616f, and vaporized working fluid 616g can remain in the combustion chamber. The mixture is ignited and burned to produce useful work 632. A portion of the work 632 can come from burning the fuel; another portion of the work 634 can come from the vaporized working fluid 616g exerting pressure on the piston in the chamber. Additional working fluid 616h can be injected into the chamber before the combustion event, during the combustion event, or after the combustion event.

Moving on to the exhaust stroke 640, some combination of combustion products 636 such as exhaust and other residual products, working fluid 616i and vaporized working fluid 616j are carried from in the combustion chamber to perform in other valuable events. The amount of vaporized working fluid 616j and liquid working fluid 616i can be varied according to the temperature in the engine, the characteristics of the working fluid, the combustion event, the fuel, and virtually any other variable in the engine cycle. Working fluid 616k can also be injected during the exhaust stroke 640 to further cool the engine, or in preparation for a downstream process in a secondary engine. A portion of the working fluid 616l and optionally exhaust can be delivered to a TCR unit 622 to develop and/or increase the chemical fuel potential energy of the fuel and/or the working fluid 616l and exhaust. A portion of the working fluid 616m can be delivered to a secondary engine 650 as described above, such as a turbine, a fuel cell, another combustion engine, or any other suitable engine that can extract energy from the working fluid 616m.

The injection routine 600 can be used with virtually any suitable fuel type, such as diesel, gasoline, methanol, ethanol, ethane, propane, butane, natural gas, ammonia or cryogenic fuels such as liquid hydrogen or methane, etc. With diesel and/or gasoline fuels it is generally preferable to inject the working fluid during the power stroke 620 or the exhaust stroke 640. With a gaseous fuel, such as hydrogen, methane, ammonia, or natural gas, the working fluid can be injected at any portion of the cycle: the intake stroke 610, the compression stroke 620, the combustion stroke 630, or the exhaust stroke 640. With cryogenic fuels such as liquid hydrogen or methane it is preferable to inject during the combustion stroke 630, or the exhaust stroke 640 depending upon the type and number of events the exhaust will be directed to perform.

Accordingly, the type of fuel and/or working fluid can be chosen based on its ability to carry heat or other components that may be formed downstream to the secondary engine 650 or TCR 622. Working fluids have different heat capacities and, accordingly, are more or less able to absorb and carry heat or process energy forward to another process. For example, where it is desired to quickly absorb low amounts of heat, a working fluid with a relatively low specific heat can be used to quickly absorb heat. Otherwise, if there is a greater amount of heat to be carried forward, a working fluid with a higher specific heat can be used. The working fluid can also be chosen based on the amount of heat and other energy that may be needed downstream in the secondary engine(s) 650 or in the TCR units 622. Another characteristic of the working fluid that can be chosen based on the subsequent engine is the ability to carry a reagent or hydrogen or other components forward that may be needed in the subsequent engine 650, and/or the ability of the working fluid to retain or release certain components under certain conditions in a given process. For example, a secondary engine 650 may operate a certain process for which a working fluid 616m is expected to yield hydrogen or other components for the process. The type of working fluid used in the injection routine 600 in the primary engine can be chosen such that the working fluid 616m can cool the primary engine and/or perform work in the primary engine without yielding the hydrogen, but in the process of the secondary engine 650, the working fluid 616m can release the hydrogen due to favorable conditions in the secondary engine 650 (e.g., temperature, pressure, or chemical environment within the secondary engine 650).

FURTHER EXAMPLES

A feed stock or working fluid comprising wet-black methanol can initially be converted to hydrogen and carbon monoxide by endothermic heat from the exhaust and by an electric resistance supplemental heater.

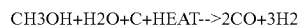

$$CH_3OH + H_2O + C + HEAT \rightarrow 2CO + 3H_2$$

However for the cooling event the liquid feed stock can be switched directly to the injector to gain the benefit of the phase change and higher heat removal capacity.

Another feedstock can be ammonia and/or ammonium hydroxide mixtures:

$$2NH_3 + HEAT \rightarrow N_2 + 3H_2$$

For the cooling event, the liquid ammonia can be switched directly to the injector to gain the benefit of the phase change for higher heat removal capacity.

Additionally, the system described herein includes the following features:

1) Conventional cooling systems including air and liquid cooling systems such as systems with temperature limitations based on rubber hoses, water-pump seals, coolants, thermostats, gaskets, radiators etc., require sacrifice of high temperature heat from the combustion chamber and consequently assured waste of energy by reducing the thermodynamic quality to the range of about 160 F to 240 F (virtually eliminating the availability for doing useful work). The current cycle of operation utilizes the highest temperature available from the surface materials of the combustion chamber and extracts heat from these surfaces to produce working fluid temperatures of 500 F to 1200 F to enable faster and more effective maintenance of desired operating temperatures by intermittent cooling to provide highly desirable power-stroke expansions of hot working fluid gases and production of as much or more torque as combustion of fuel.

2) Steam engines powering ships, heavy locomotives, steam-shovels, pile-drivers, automobiles etc., have a long service lives for producing highly desirable torque and operational capabilities by heating water in a boiler to form steam which is taken to one or more drivers with piston and cylinder assemblies to produce thrust that is converted into rotary motion at the desired torque. A typical temperature and pressure of the steam from heavy coal-fired locomotive boilers is 190 PSI at 383 F to produce 8,000 horsepower to pull 100 heavily loaded freight cars at speeds up to 100 MPH or as permitted by track design and maintenance. In 1906 the Land Speed Record was established by a Stanley steam car as it achieved 127 mph at Ormond Beach, Fla. In comparison the current cycle using water as a working fluid can readily utilize a diesel or gasoline engine's existing system including cylinders, pistons, crankshafts etc to produce and expand steam from temperatures of 400 F to 600 F and pressures of 200 to 500 PSI and provide highly desirable torque and power along with maintenance of the combustion chamber component temperatures within the same range as provided by conventional cooling systems.

3) It is desirable to operate current system in conjunction with thermochemical regeneration (TCR) and/or turbochargers, turbogenerators, gas-combustion turbines, and/or working fluid recovery systems. Thus work production and/or extraction of heat to drive endothermic chemical processes reduces the temperature of the working fluid to greatly increase the density and reduce the vapor pressure to cause condensation for convenient storage and/or immediate reuse in the current cycle.

From the foregoing, it will be appreciated that specific embodiments of the disclosure have been described herein for purposes of illustration, but that various modifications may be made without deviating from the spirit and scope of the disclosure. For example, the any number of primary engines and secondary engines can be used in a cascading series. Also, any single engine can be considered a primary engine or a secondary engine depending on how they exchange fluids according to a given configuration. Moreover, the working fluid can be any suitable fluid and is not limited to specific examples listed herein. The engine systems may include alternative configurations than those shown and described and still be within the spirit of the disclosure.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number, respectively. When the claims use the word "or" in reference to a list of two or more items, that word covers all of the following interpretations of the word: any of the items in the list, all of the items in the list, and any combination of the items in the list. In addition, the various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the disclosure can be modified, if necessary, to employ fuel injectors and ignition devices with various configurations, and concepts of the various patents, applications, and publications to provide yet further embodiments of the disclosure.

These and other changes can be made to the disclosure in light of the above-detailed description. In general, in the following claims, the terms used should not be construed to limit the disclosure to the specific embodiments disclosed in the specification and the claims, but should be construed to include all systems and methods that operate in accordance with the claims. Accordingly, the invention is not limited by the disclosure, but instead its scope is to be determined broadly by the following claims.

The invention claimed is:

1. A method of limiting a peak temperature of a combustion chamber in a plurality of interconnected engines, the method comprising:
    controlling the peak temperature of a combustion chamber in a first engine comprising
    in a first portion of a cycle of the first engine;
    injecting fuel directly into the combustion chamber during at least one of an intake stroke and a compression stroke of the first cycle; and
    igniting the fuel in the combustion chamber to cause combustion;
    monitoring a temperature of the combustion chamber resulting from the combustion; and
    in at least one of the first portion or a second portion of the cycle of the engine
    when the temperature reaches a predetermined value,
    injecting coolant directly into the combustion chamber during at least one of a power stroke and/or an exhaust stroke of the cycle;
    controlling the peak temperature of a combustion chamber in a second engine according to the steps recited for controlling the peak temperature of a combustion chamber in the first engine, wherein an exhaust stream from the first engine is a working fluid for the second engine such that the first engine is fluidically coupled to the second engine.

2. The method of claim 1 wherein: injecting the fuel directly into the combustion chamber comprises injecting a first fuel that generates a first temperature of combustion in the combustion chamber; and
    injecting the coolant directly into the combustion chamber comprises injecting a second fuel that generates a second temperature of combustion in the combustion chamber, wherein the second temperature is less than the first temperature.

3. The method of claim 1 wherein injecting the coolant directly into the combustion chamber comprises injecting a fluid or gas that does not combust in the combustion chamber.

4. The method of claim 1 wherein injecting the coolant directly into the combustion chamber comprises injecting a hydrogenous coolant directly into the combustion chamber.

5. The method of claim 1 wherein injecting the coolant directly into the combustion chamber comprises injecting the coolant during each of the power stroke and the exhaust stroke of the cycle.

6. The method of claim 1 wherein the predetermined value of the temperature is 2200 degrees C.

7. The method of claim 1 wherein:
injecting the fuel directly into the combustion chamber comprising injecting the fuel with an injector; and
igniting the fuel in the combustion chamber comprises igniting the fuel with an ignition feature carried by the injector.

8. The method of claim 1, further comprising: determining a predefined operational mode of the engine, the predefined operational mode comprising an acceleration or high load operational condition of the engine; and
when the engine operates in the predefined operational mode, injecting the coolant directly into the combustion chamber only during at least one of the power stroke and an exhaust stroke of the cycle.

9. A method of cooling a combustion chamber in an engine, the method comprising:
cooling a combustion chamber in a first engine comprising
introducing fuel into the combustion chamber of the engine, wherein an energy transfer device moves at least partially within the combustion chamber through an intake stroke, a compression stroke, a power stroke, and an exhaust stroke;
causing the fuel to combust in the combustion chamber;
monitoring a temperature of the combustion chamber; and
when the temperature reaches a predetermined value, introducing coolant into the combustion chamber only during at least one of the power stroke and the exhaust stroke of the energy transfer device;
cooling a combustion chamber in a second engine according to the steps recited for cooling the combustion chamber in the first engine, wherein a working fluid exiting an exhaust port of the first engine enters an intake of the second engine such that the exhaust of the first engine is fluidically coupled to the intake of the second engine.

10. The method of claim 9 wherein introducing the coolant into the combustion chamber comprises introducing a coolant that does not combust in the combustion chamber.

11. The method of claim 9 wherein introducing the coolant into the combustion chamber comprises introducing a coolant that combusts in the combustion chamber at a lower temperature than the fuel.

12. The method of claim 9 wherein: introducing the fuel into the combustion chamber comprising introducing the fuel with an injector; and causing the fuel to combust comprises generating an ignition event with an ignition feature carried by the injector.

13. The method of claim 9 wherein: introducing the fuel into the combustion chamber comprising introducing the fuel with an injector; and
introducing the coolant into the combustion chamber comprises introducing the coolant with the injector.

14. The method of claim 9, further comprising: monitoring the engine for a predefined operational condition of the engine; and
when the engine operates in the predefined operational condition, introducing the coolant into the combustion chamber only during at least one of the power stroke and the exhaust stroke.

\* \* \* \* \*

UNITED STATES PATENT AND TRADEMARK OFFICE
CERTIFICATE OF CORRECTION

PATENT NO.       : 8,683,988 B2                                Page 1 of 1
APPLICATION NO.  : 13/584775
DATED            : April 1, 2014
INVENTOR(S)      : Roy Edward McAlister et al.

It is certified that error appears in the above-identified patent and that said Letters Patent is hereby corrected as shown below:

In the Specification

In column 7, line 29, after "requirements" insert -- . --.

Signed and Sealed this
Twenty-second Day of July, 2014

Michelle K. Lee
*Deputy Director of the United States Patent and Trademark Office*